A. T. CHILDS.
TEMPERATURE INDICATOR FOR TRANSFORMERS AND THE LIKE.
APPLICATION FILED MAY 25, 1918.
1,379,526. Patented May 24, 1921.
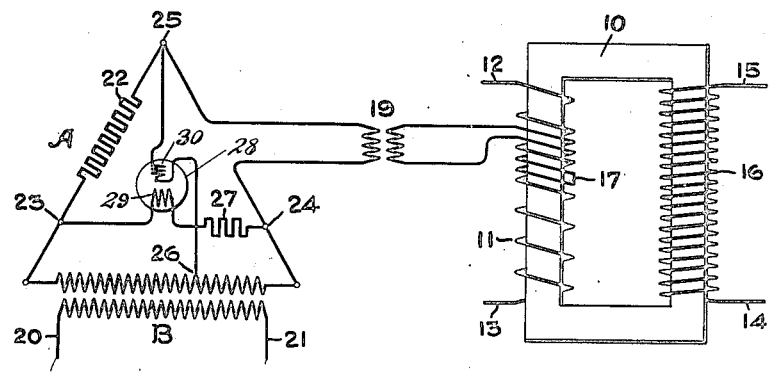
Inventor:
Albert T. Childs,
by Albert G. Davis
His Attorney.

UNITED STATES PATENT OFFICE.

ALBERT T. CHILDS, OF PITTSFIELD, MASSACHUSETTS, ASSIGNOR TO GENERAL ELECTRIC COMPANY, A CORPORATION OF NEW YORK.

TEMPERATURE-INDICATOR FOR TRANSFORMERS AND THE LIKE.

1,379,526.   Specification of Letters Patent.   Patented May 24, 1921.

Application filed May 25, 1918. Serial No. 236,661.

*To all whom it may concern:*

Be it known that I, ALBERT T. CHILDS, a citizen of the United States, residing at Pittsfield, in the county of Berkshire, State of Massachusetts, have invented certain new and useful Improvements in Temperature-Indicators for Transformers and the like, of which the following is a specification.

My invention relates to a temperature indicator for transformers and the like, and it has for its object the improvement of a device of this character.

It is well known that transformers, and other similar apparatus, develop heat during their operation, and that there will be a point within the transformer or other device commonly known as the "hot-spot" where the temperature is higher than at any other point, and since the temperature of no part of the transformer may safely exceed a certain predetermined value, the capacity of the transformer is limited by the temperature attained by this "hot-spot." This spot, however, is usually located within the windings and its temperature, therefore, cannot be determined by the use of the ordinary thermometer, while the temperature of the exterior parts of the apparatus or of the oil, when the apparatus is immersed in oil affords no certain or accurate indication of the temperature of the "hot-spot." In order, therefore, to operate a transformer with safety, it is necessary to keep the temperature of the "hot-spot" below the permissible "hot-spot" temperature; otherwise, the actual "hot-spot" temperature is likely to exceed the permissible temperature with consequent injury to the transformer.

In accordance with my invention, a single resistance member having a substantial temperature coefficient of resistance is arranged in close thermal relation to the windings of the transformer, or other like apparatus, in which the heat is developed. The variations in temperature produce corresponding changes in the resistance of this member, which change if properly ascertained affords an accurate measure of the temperature of the member. According to my invention therefore I employ a four arm Wheatstone bridge of a type modified and arranged readily to calibrate and indicate these changes; the resistance member being connected as one arm of the bridge though preferably through an insulating transformer.

For a more complete understanding of the nature and objects of my invention reference should be had to the following detailed description when taken in connection with the accompanying drawing, which shows, in a diagrammatic manner, my invention used in connection with a transformer.

Referring now to the drawing, 10 is the core of a main transformer which is provided with a primary winding 11 connected to supply conductors 12 and 13, and with a secondary winding 16 connected to a load circuit which is indicated by the reference numerals 14 and 15.

A resistance member 17 is arranged in close thermal relation to the transformer winding whose temperature is to be determined which, in the present case, is the primary winding 11. This resistance member is non-inductive, as shown in the drawing. Preferably this resistance member is wound between the conductors of one of the main transformer windings and is placed at the point corresponding to the "hot-spot" of the transformer so that it assumes substantially the same temperature as that of the "hot-spot." This resistance member shown at 17 is connected to the bridge A through an insulating transformer 19, and functions as though it were directly connected in as one arm of the bridge.

Two other arms of the bridge are connected across an external source of electrical energy. This is conveniently accomplished as indicated in the drawing through the instrumentality of the auxiliary transformer B, whose secondary serves as the two arms, while its primary is connected to the source of alternating current supplied from the mains 20 and 21. While I have shown the auxiliary transformer as composed of separate primary and secondary windings it will be apparent that an auto-transformer might be used equally well.

The fourth arm of the bridge is shown at 22, and comprises resistance material having substantially a zero temperature coefficient. The four armed bridge has its four corners denoted respectively by the points 23, 24, 25 and 26 in the drawing. An instrument 28 which is in effect a separately excited dynamometer, has its current coil 29 connected in series with a fixed resistance 27 between the points 23 and 24. It is obvious that a difference of potential will be created between the points 23 and 24 by the transformer B. Now if the impedance of the transformer B be neglected (and it may be for practical purposes), the potentials from point 26 to points 23 and 24 respectively will remain constant, whereas the potential of the point 25 will change in accordance with the change in the resistance of the member 17. The potential coil 30 of the dynamometer is connected across the bridge at points 25 and 26 and the resistance of the same is high as compared with the impedance of the dynamometer so that the current in this circuit is practically in phase with and proportional to the electromotive force impressed on the bridge.

The operation of the device embodying my invention will readily be understood from the above description and is as follows:

The resistance member 17 being so arranged with reference to the bridge as to balance the bridge at the normal temperature of the transformer, say 100 degrees C., the current through the current coil 29 of the dynamometer in phase is at right angles to the current in the fixed coils and consequently there is no torque, and the controlling spring (not shown) will be so adjusted that a pointer or other indicating device conveniently attached to the moving coil will come to rest on the 100 degrees C. point of the scale. Now, any change in temperature of the resistance member will cause a corresponding change in its resistance and will unbalance the bridge and change the magnitude and phase relation of the current flowing through the movable coil of the dynamometer 28 and will cause the pointer to move in one direction or another depending on whether the temperature of the resistance member goes above or below the normal temperature. Since the variation in current in the movable coil is a function of the temperature change of the resistance member 17, the scale of the dynamometer may be calibrated in degrees.

By the use of the secondary of the transformer as two arms of the bridge, the bridge is made more sensitive than would be the case with two ordinary resistance members. This is due to the fact that the impedance of the transformer is very much lower than would be the impedance of two corresponding resistance members.

While I have herein shown and described one modification of my invention, I do not desire to be limited to the exact arrangement shown and described but seek to cover in the appended claims all those modifications which come within the true spirit and scope of my invention.

What I claim as new and desire to secure by Letters Patent of the United States, is:—

1. A temperature indicator for transformers comprising a bridge having an arm composed of a single non-inductive resistance member which has a substantial temperature coefficient of resistance and is adapted to be arranged in close thermal relation with a winding of the transformer, and means associated with said bridge responsive to the E. M. F. consumed by the resistance of said member for indicating the temperature variations in said member.

2. A temperature indicator for transformers comprising a bridge having an arm composed of a single non-inductive resistance member which has a substantial temperature coefficient of resistance and is adapted to be arranged in close thermal relation with a winding of the transformer, a dynamometer associated with said bridge and connected in shunt to said resistance member, an external source of alternating electrical energy, and an auxiliary transformer having its primary connected to said source and its secondary connected in as two arms of said bridge.

3. The combination with a transformer having a winding whose temperature is to be ascertained, of a single non-inductive resistance member having a substantial temperature coefficient of resistance disposed in close thermal relation with said winding, a bridge having one arm connected to include said member, an insulating transformer interposed in the connections to said member, and means associated with said bridge responsive to the E. M. F. consumed by the resistance of said member for indicating the temperature variations in said member.

4. The combination with a transformer having a winding whose temperature is to be ascertained, of a single non-inductive resistance member having a substantial temperature coefficient of resistance disposed in close thermal relation with said winding, a bridge having one arm connected to include said member, an insulating transformer interposed in the connections to said member, an indicating dynamometer connected to said bridge in shunt to said resistance member, an external source of alternating electrical energy, and an auxiliary transformer having its primary connected to said source and its secondary connected in as two arms of said bridge.

In witness whereof, I have hereunto set my hand this 18th day of May, 1918.

ALBERT T. CHILDS.